Nov. 15, 1966  H. E. WEEKS ETAL  3,285,359
TRACTOR
Filed April 23, 1964  4 Sheets-Sheet 1
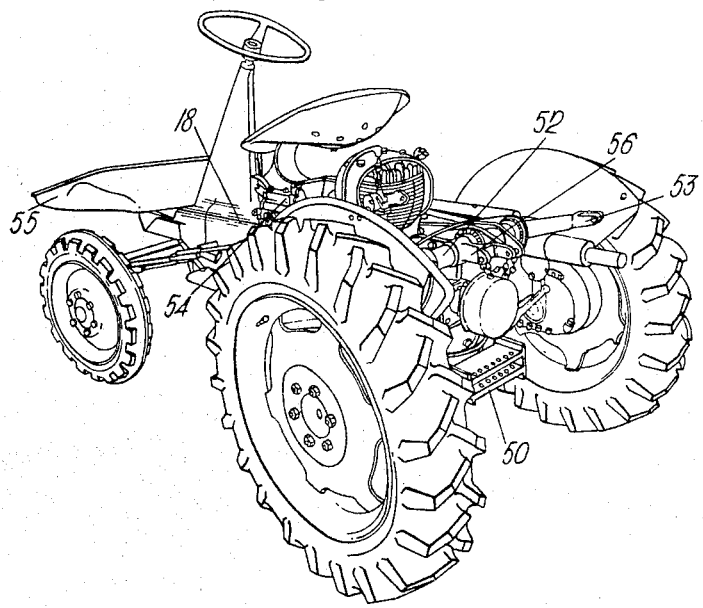
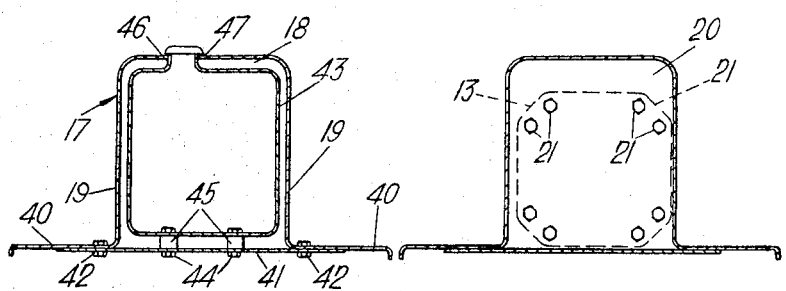
Inventors
HAROLD EDGAR WEEKS &
ERIC ISAAC WATSON
By
Tweedale + Gerhardt
Attorneys

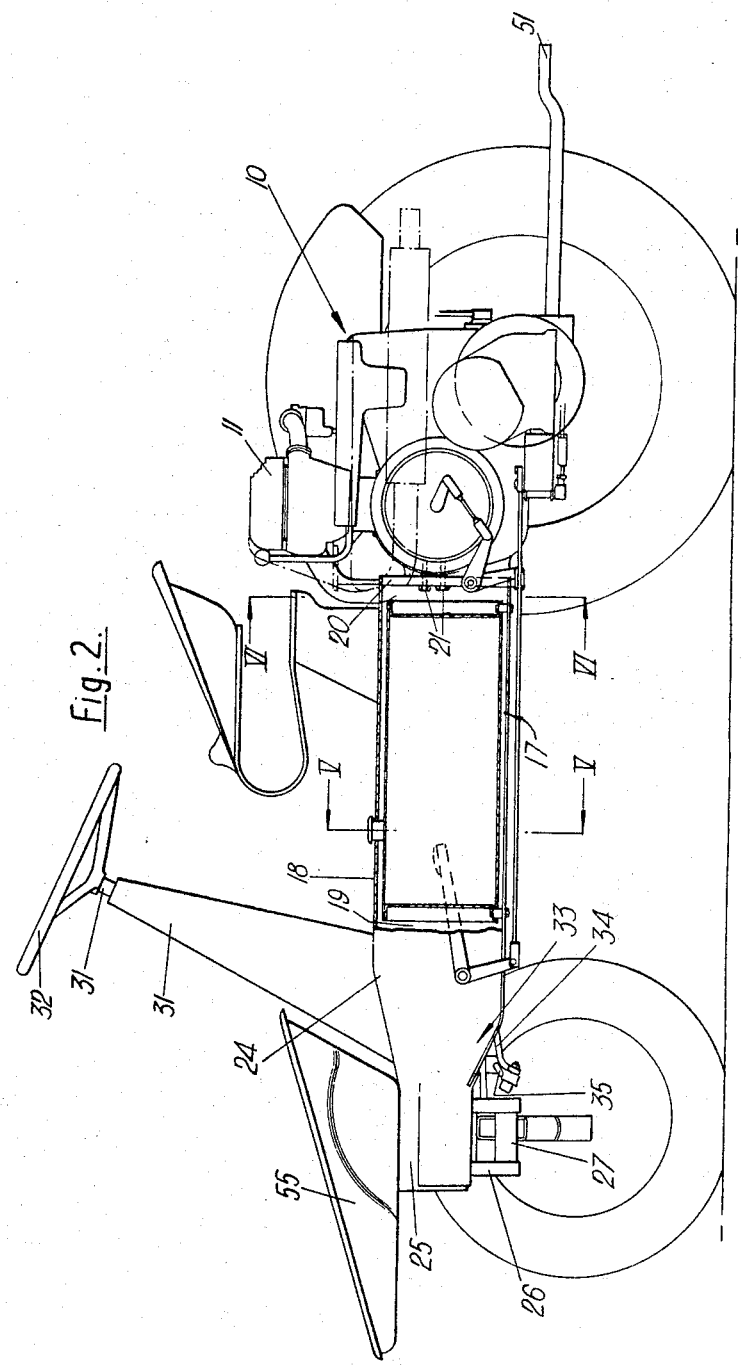

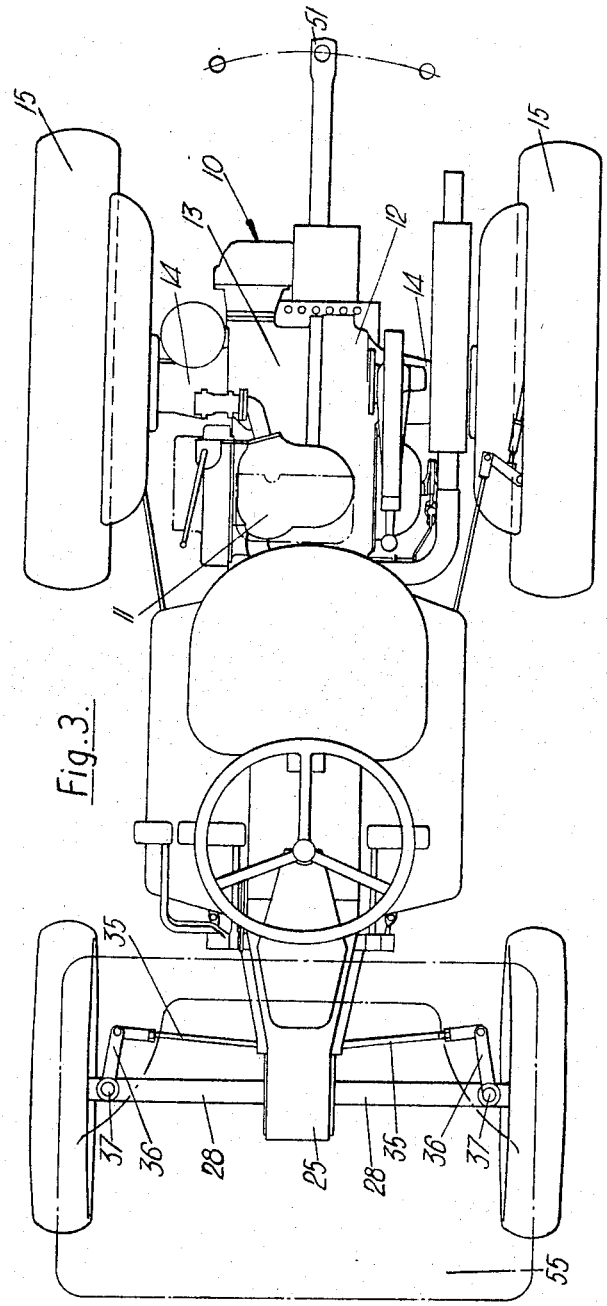

United States Patent Office 3,285,359
Patented Nov. 15, 1966

3,285,359
TRACTOR
Harold E. Weeks, Stoke, Coventry, and Eric I. Watson, Solihull, England, assignors to Massey-Ferguson (United Kingdom) Limited, London, England, a British company
Filed Apr. 23, 1964, Ser. No. 362,089
Claims priority, application Great Britain, May 1, 1963, 17,186/63
4 Claims. (Cl. 180—54)

The invention relates to tractors and is particularly, but not exclusively, applicable to the general construction of a small light tractor.

It is an object of the invention to provide a tractor which may be relatively cheap and simple to produce.

In accordance with the invention, a tractor includes a rear engine and transmission assembly for driving the rear wheels of the tractor, a front steerable wheel assembly, and a longitudinally extending chassis member of inverted U-shape connecting said assemblies and enclosing and supporting a fuel tank.

Preferably the chassis member is provided with a detachable lower cover plate with the fuel tank mounted thereon, the arrangement being such that the cover plate and fuel tank may be removed as a single unit.

In order that the invention may be more clearly understood, embodiments of the invention will now be described by way of example with reference to the accompanying drawings in which:

FIG. 1 is a perspective view from the rear of a tractor according to the invention.

FIG. 2 is a side view partly in section of the tractor.

FIG. 3 is a plan view.

FIG. 5 is a section on the line V—V of FIG. 2.

FIG. 6 is a section on the line VI—VI of FIG. 2.

Figure 4:
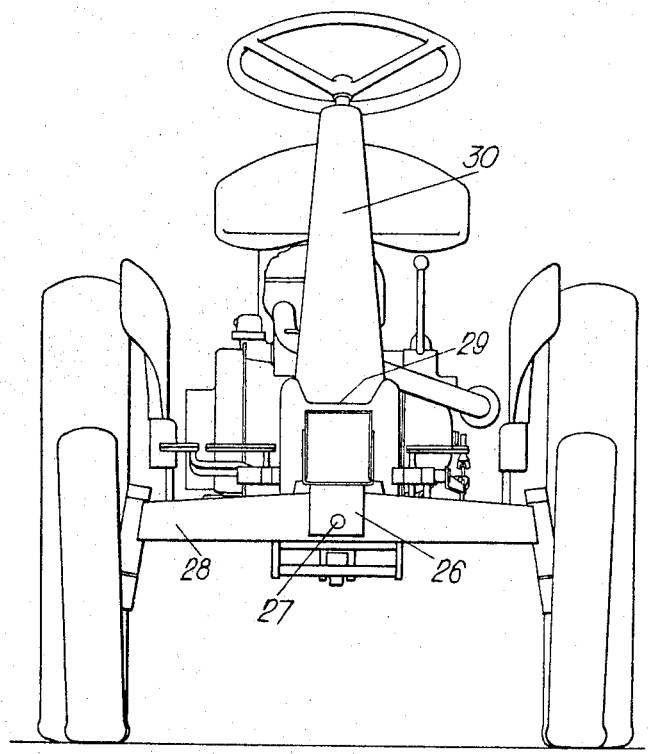
FIG. 4 is an elevation from the front.

With reference to FIGS. 2 and 3, the rear engine and transmission assembly 10 includes an engine 11 mounted over a gap, not shown, provided in the top face of a pair of casings 12, 13. Casings 12, 13 are detachably connected together in a vertical, fore and aft plane to form the housing for the engine crankshaft and transmission (not shown). Each casing 12, 13 is provided with an outwardly extending flared portion 14 housing a drive shaft drivingly connected to its associated wheel 15. Since the details of this assembly form no part of the invention it will not be described in further detail.

A chassis member 17, including a top horizontally disposed part 18 (FIG. 5) and downwardly depending side members 19 to give a chassis of inverted channel or U-shape, is closed at its rear end by a plate 20 (FIG. 6) detachably connected by bolts 21 to the assembly 10. Chassis member 17 may be pressed into shape from a flat plate in a single operation.

Chassis 17 is located substantially centrally of the longitudinal axis of the tractor and at its front end is tapered, as at 24, to form a forwardly projecting nose 25 (FIG. 2). Supported by the nose 25 is a bracket 26 carrying a pin 27 to provide a pivotal support for the front axle 28.

The tapered portion 24 of the chassis is provided with an indentation 29 (FIG. 4) into which is fitted, and welded thereto, a pedestal 30, supporting and housing a steering column 31 having attached to its upper end a steering wheel 32. The steering column 31 extends beyond the pedestal through a hole in the indentation 29 into a steering gear assembly located, at 33, inside the chassis. A drop arm 34 projects below the chassis from the steering gear assembly and is connected to two track rods 35, each extending to an associated steering arm 36 mounted on the usual front axle king pin 37 rotatably mounted on the front axle 28.

It is to be noted that due to the above described chassis construction the drop arm 34 may be mounted centrally of the tractor, so that the steering linkage may be very simple. Furthermore, the two track rods 35 may be identical.

Referring now more particularly to FIGS. 2 and 5 each side member 19 has formed integrally therewith a horizontally extending step plate 40 to act as rests for the driver's feet when seated on the tractor.

A cover plate 41 is affixed by bolts 42 to the step plates 40 and acts as a closure member for the chassis 17.

A fuel tank 43 is attached by bolts 44 to the cover plate but raised slightly therefrom by washers 45. It is preferred that the washers 45 be of resilient material, for instance, rubber to absorb vibrations and prevent them being passed to the fuel tank. The fuel tank includes a cylindrical neck 46 extending through a hole 47 in the chassis part 18 to provide a filling point for the tank. In order to keep the fuel tank cool, and hence mitigate the danger of fire, the fuel tank does not closely nest within the chassis but a free air space is left completely around the tank.

By removing the bolts 42 and detaching the fuel tank and cover plate, bolts 21 become accessible, and assembly 10 may be detached from the front part of the tractor for service. In addition, since the fuel tank is enclosed, it is well protected and may be made from lighter material than is normal.

Due to the foregoing construction, a relatively high proportion of the tractor weight is carried by the driven rear wheels, thus increasing the tractive ability of the tractor. Towed implements may be hitched to the tractor, either through the fixed drawbar 50 (FIG. 1) or the swinging drawbar 51 (FIG. 2). Alternatively, or additionally, the tractor may be provided with a three point hitch for the reception of mounted implements. This hitch is shown partially in FIG. 1. Briefly it includes an assembly which is attached to the rear ends of the casings 12, 13 and includes a transversely extending rock shaft 52. An arm on the rock shaft is connected to a hydraulic ram having its other end attached to one side of the casing 13. The rock shaft also carries two crank arms 53 each being connected through the usual drop link (not shown) to a draft link pivotally mounted on the associated casing 12 or 13. A bracket 56, surrounding the rock shaft, but non-rotatable therewith is forked at its outer end to provide a pivot point for the usual top link. A valve unit 54 to control flow of oil to and from the ram is mounted on the chassis member 18 at a point convenient to the tractor driver.

Under certain conditions, and particularly when using mounted implements, the tractor front wheels may tend to leave the ground. To counteract this tendency, a tray 55 for ballast may be mounted by means of suitable brackets on the nose 25. Tray 55 is arranged so that it can be easily and speedily detached for forward visibility as well as to enable an implement to be mounted at the forward end. When fitted, tray 55 may be loaded with suitable weights as necessary, or alternatively, it may be used as a load carrier when it is desired to use the tractor to transport material.

By forming the chassis in the manner described, a simple, light, yet strong structure is obtained. Furthermore, utilizing the space provided within the channel to house the fuel tank results in a neat appearance and additionally allows the provision of a larger tank than would otherwise be possible. Moreover, the air space between the tank and the chassis may be utilized to house driver operated control linkages to the engine and transmission, thus materially assisting in improving the appearance of the tractor, and enabling the driver to mount and dismount more easily.

What is claimed is:

1. In a tractor including a rear engine and transmission assembly for driving the rear wheels of the tractor and a front steerable wheel assembly, a longitudinally extending chassis member of inverted U-shape connecting said assemblies, a fuel tank enclosed in said chassis member, said chassis member being provided with a detachable lower cover plate, said fuel tank being mounted on the cover plate whereby the cover plate and fuel tank may be removed from the chassis member as a single unit, and resilient spacers between the fuel tank and said cover plate, the outer surfaces of the fuel tank being spaced from the inner surfaces of the chassis member to provide an air space therebetween.

2. In a tractor including a rear engine and transmission assembly for driving the rear wheels of the tractor and a front steerable wheel assembly, a longitudinally extending chassis member of inverted U-shape connecting said assemblies, a fuel tank enclosed in said chassis member, said chassis member being provided with a detachable lower cover plate, said fuel tank being mounted on the cover plate whereby the cover plate and fuel tank may be removed from the chassis member as a single unit, and means for detachably connecting the rear engine and transmission assembly with said chassis member at a location accessible upon removal of the fuel tank permitting said rear engine and transmission assembly to be detached from the chassis member and front wheel assembly for service.

3. A tractor having a rear engine and transmission assembly, drive wheels mounted on said rear engine and transmission assembly, a chassis member connected to the front portion of the rear engine and transmission assembly and extending forwardly therefrom with the longitudinal axis of said chassis member defining the longitudinal axis of the tractor, said chassis member being of inverted U-shape in cross-section with a top horizontal member and depending side members, a lower cover plate connected with and extending between said side members to form an enclosure therewith, a fuel tank supported within said enclosure intermediate the ends of the chassis member, and a steerable wheel assembly mounted on said chassis member at the front end thereof.

4. A tractor as defined in claim 3 wherein the chassis member is tapered at its forward end to form a front portion of reduced cross-section coaxial with the remaining portion of the chassis member, and further including step plates extending laterally outwardly from the lower ends of said side members, said lower cover plate being detachably mounted on the lower sides of said step plates, and wherein said steerable wheel assembly is mounted on the reduced portion of the chassis member and said fuel tank is mounted on said lower cover plate.

References Cited by the Examiner
UNITED STATES PATENTS

| | | | |
|---|---|---|---|
| 1,982,316 | 11/1934 | Mackenzie | 180—54 |
| 2,440,550 | 4/1948 | Martin. | |
| 2,612,964 | 10/1952 | Hobbs | 180—54 |
| 2,788,858 | 4/1957 | Aasland et al. | 180—1 X |
| 2,808,892 | 10/1957 | Walker | 180—1 |

BENJAMIN HERSH, *Primary Examiner.*

MILTON L. SMITH, *Examiner.*